No. 791,556. Patented June 6, 1905.

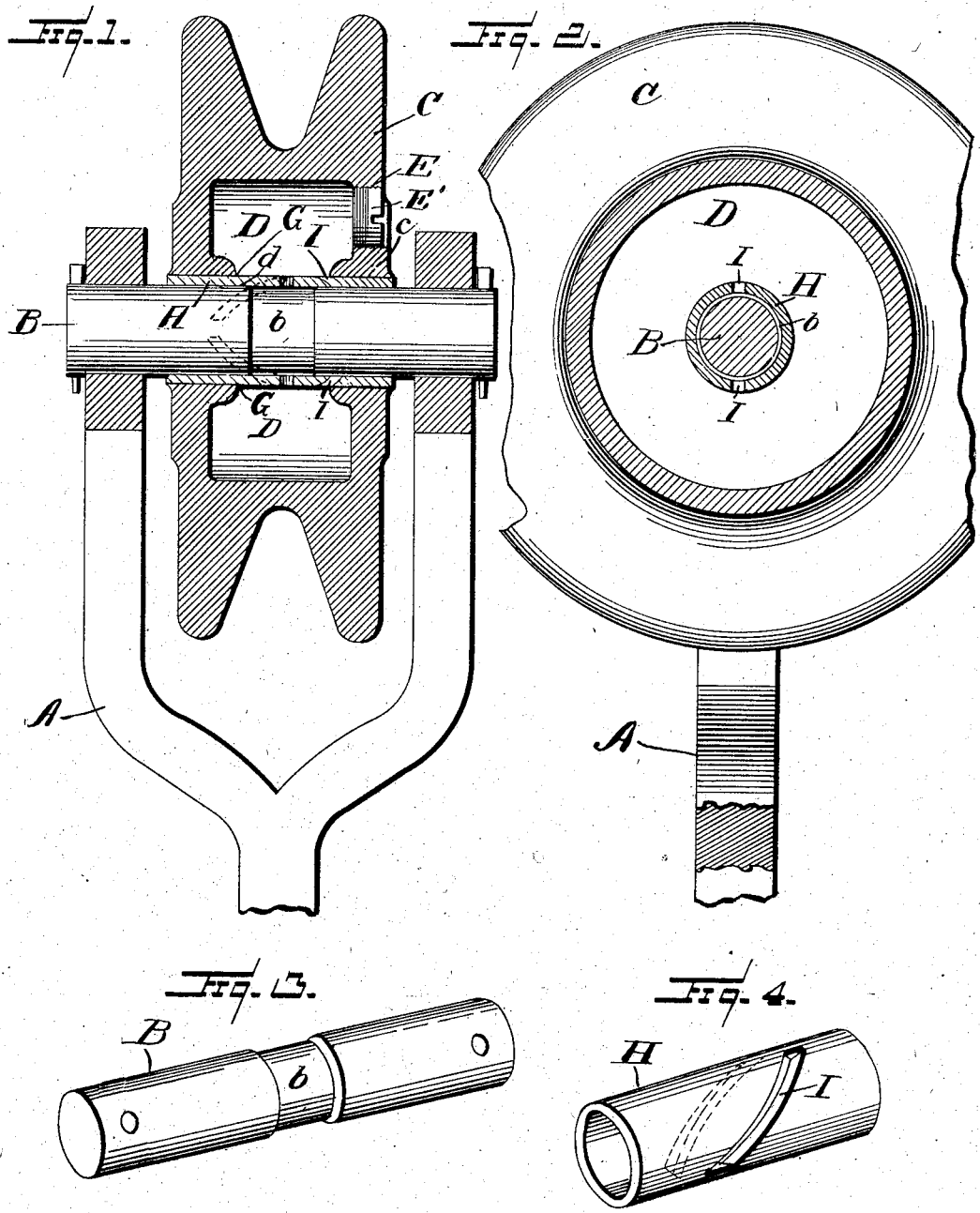

UNITED STATES PATENT OFFICE.

JOHN HENSLEY, OF HUNTINGTON, INDIANA.

TROLLEY-WHEEL.

SPECIFICATION forming part of Letters Patent No. 791,556, dated June 6, 1905.

Application filed July 20, 1904. Serial No. 217,338.

*To all whom it may concern:*

Be it known that I, JOHN HENSLEY, a citizen of the United States, residing at Huntington, in the county of Huntington and State of Indiana, have invented a new and useful Improvement in Trolley-Wheels, of which the following is a specification.

My invention relates to improvements in lubricators for trolley-wheels.

The object of my invention is to provide a trolley-wheel of this character which is adapted to hold a lubricating-grease and to provide means wherein the grease is more readily fed to the shaft or journal and distributed thereon throughout the wheel bearing-surface thereof.

In the accompanying drawings, Figure 1 is a vertical sectional view of a harp, showing my device applied thereto. Fig. 2 is a transverse sectional view of the same. Fig. 3 is a perspective view of the shaft removed from the harp, and Fig. 4 is a perspective view of the bushing removed from the trolley-wheel.

Referring now to the drawings, A represents a harp, which, as shown, is of an ordinary form and which is provided with the usual shaft or journal B, which may be held therein against rotation in any desired manner. The said shaft intermediate its ends is provided with a circumferential grease-retaining groove $b$, which is of a sufficient width so that the same may hold considerable grease.

The trolley-wheels in devices of this character are usually of a width considerably less than the distance between the arms of the harp, and thus the trolley-wheel is adapted to travel longitudinally on the shaft, allowing the same to more readily follow the trolley-wire and preventing it from jumping therefrom. In devices of this character it has been found difficult to lubricate the axle or shaft throughout its entire bearing-surface without using an unnecessary amount of oil or grease and wasting the same. The trolley-wheel C, as clearly shown in Fig. 1, is of the ordinary form, being provided with a central opening $c$ and an enlarged circular grease-containing cavity D intermediate the opening $c$, and a trolley-wire bearing-surface. Communicating with said cavity is an opening E, which is provided with a cap $E'$, by means of which the cavity may be readily filled with grease or oil. I preferably use grease, as it has been found to be much more economical and requiring refilling less frequently. Extending inwardly from said cavity D and communicating with the central opening $d$ is a circumferential slot G, through which the grease may spread from the cavity D. In trolley-wheels a bushing H is always used, which is removable and allows of the same being replaced and obviating the replacing of the whole wheel when its bearing has become worn. The bushing is usually driven in the opening through the wheel and held therein by friction, although any desired means for fastening the same in the wheel might be used. The said bushing H is provided intermediate its ends with oppositely-arranged oblique slots I, which are in communication with the slot G and feed the grease to the journal. The shaft or journal B passes through the said bushing, and it will be readily seen that upon rotation of the trolley-wheel the same because of friction becomes slightly warm, and the grease slowly flows through the slot G into the oblique slots I and from there into the grease-groove $b$ and onto the shaft. The rotation of the wheel and necessarily of the bushing the inclination of the said grooves carried thereby is such that it will gather the grease from the groove $b$ and cause the same to travel toward the end of the shaft. The grease is thus distributed along the entire wheel bearing-surface of the spindle, thus thoroughly lubricating the wheel.

Having fully described my invention, what I claim as new, and desire to secure by Letters Patent, is—

1. In a lubricator, the combination with a shaft having an annular groove intermediate its ends, of a bushing loosely mounted on said shaft and having oppositely-arranged oblique slots connecting with the groove on the shaft, a trolley-wheel carrying said bushing and having a lubricant-containing cavity and an annular slot communicating with said cavity and the obliquely-arranged slots, said wheel being adapted to travel between the ends of the shaft and distribute the lubricant over its entire bearing-surface, substantially as described.

2. In a lubricator, the combination with a shaft having an annular groove intermediate its ends, of a trolley-wheel loosely mounted on said shaft having a lubricant-containing cavity, a bushing carried on said wheel having oppositely-arranged oblique slots communicating with the cavity in the wheel and the annular groove on the shaft, said wheel and bushing being adapted to travel between the ends of the shaft and maintain communication between the cavity in the wheel and the groove on the shaft and distribute the lubricant over the entire bearing-surface of the shaft, substantially as described.

In testimony whereof I have signed my name to this specification in the presence of two subscribing witnesses.

JOHN HENSLEY.

Witnesses:
U. S. LESH,
D. L. SHAEFF.